(12) United States Patent
Silverbrook et al.

(10) Patent No.: US 7,938,521 B2
(45) Date of Patent: May 10, 2011

(54) INK CARTRIDGE FOR A COMPUTER SYSTEM HAVING AN INTEGRAL PRINTER

(75) Inventors: Kia Silverbrook, Balmain (AU); Tobin Allen King, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 12/620,566

(22) Filed: Nov. 17, 2009

(65) Prior Publication Data

US 2010/0060702 A1 Mar. 11, 2010

Related U.S. Application Data

(63) Continuation of application No. 12/114,811, filed on May 4, 2008, now Pat. No. 7,631,961, which is a continuation of application No. 11/298,633, filed on Dec. 12, 2005, now Pat. No. 7,370,947, which is a continuation of application No. 10/982,772, filed on Nov. 8, 2004, now Pat. No. 7,063,408, which is a continuation of application No. 10/713,058, filed on Nov. 17, 2003, now Pat. No. 7,101,034, which is a continuation of application No. 09/436,508, filed on Nov. 9, 1999, now Pat. No. 6,626,529.

(30) Foreign Application Priority Data

Nov. 9, 1998 (AU) .......................................... PP7020

(51) Int. Cl.
*B41J 2/175* (2006.01)
(52) U.S. Cl. ......................................................... 347/86
(58) Field of Classification Search .................. None
See application file for complete search history.

(56) References Cited

U.S. PATENT DOCUMENTS

| | | | |
|---|---|---|---|
| 4,904,100 A | | 2/1990 | Enix |
| 4,937,676 A | | 6/1990 | Finelli et al. |
| 4,961,088 A | | 10/1990 | Gilliland et al. |
| 5,144,340 A | | 9/1992 | Hotomi et al. |
| 5,155,502 A | * | 10/1992 | Kimura et al. .................. 347/87 |
| 5,240,238 A | | 8/1993 | Lee |
| 5,336,004 A | | 8/1994 | Harada et al. |
| 5,393,152 A | | 2/1995 | Hattori et al. |
| 5,419,543 A | | 5/1995 | Nakamura et al. |
| 5,441,251 A | | 8/1995 | Ohta |
| 5,462,375 A | | 10/1995 | Isobe et al. |

(Continued)

FOREIGN PATENT DOCUMENTS

EP 0848540 A 6/1998

(Continued)

*Primary Examiner* — Stephen D Meier
*Assistant Examiner* — Alexander C Witkowski

(57) ABSTRACT

An ink cartridge for a computer system having an integral printer includes a media housing portion having top and bottom moldings mated to form a housing for storing sheets of paper therebetween, the housing portion having a print media transport mechanism; an ink storage portion having an ink storage base molding defining a plurality of distinct ink chambers, the ink storage base molding attached to an underside of the bottom molding and sealed therewith; and an ink manifold having ink outlet nozzles adapted to facilitate fluid communication with the printer, the ink outlet nozzles provided on a surface attached to and extending beyond an edge of the bottom molding. Each of the distinct ink chambers include a portion extending beyond the edge of the bottom molding, which portions form part of the ink manifold.

5 Claims, 11 Drawing Sheets

U.S. PATENT DOCUMENTS

| | | | |
|---|---|---|---|
| 5,475,279 A | 12/1995 | Takeuchi et al. |
| 5,493,409 A | 2/1996 | Maeda et al. |
| 5,559,932 A | 9/1996 | Machida et al. |
| 5,602,574 A | 2/1997 | Williams |
| 5,608,437 A | 3/1997 | Iwata et al. |
| 5,621,445 A | 4/1997 | Fong et al. |
| 5,623,581 A | 4/1997 | Attenberg |
| 5,946,007 A | 8/1999 | Otsuka et al. |
| 5,949,458 A | 9/1999 | Studholme |
| 5,971,533 A | 10/1999 | Kinoshita et al. |
| 5,971,641 A | 10/1999 | Looney |
| 6,056,286 A | 5/2000 | Koga |
| 6,081,284 A | 6/2000 | Tosaka et al. |
| 6,082,581 A | 7/2000 | Anderson et al. |
| 6,149,256 A | 11/2000 | McIntyre et al. |
| 6,270,271 B1 | 8/2001 | Fujiwara |
| 6,293,469 B1 | 9/2001 | Masson et al. |
| 6,402,308 B1 | 6/2002 | Hattori et al. |
| 6,565,196 B2 | 5/2003 | Matsuo et al. |
| 6,577,818 B2 | 6/2003 | Hirano |
| 6,854,836 B2 | 2/2005 | Ishinaga et al. |
| 2005/0104941 A1 | 5/2005 | Tanaka |

FOREIGN PATENT DOCUMENTS

| | | |
|---|---|---|
| JP | 59-190857 A | 10/1984 |
| JP | 60-204361 | 10/1985 |
| JP | 02-147527 | 6/1990 |
| JP | 04-286444 | 10/1992 |
| JP | 05-16377 | 1/1993 |
| JP | 05-201081 | 8/1993 |
| JP | 05-330150 | 12/1993 |
| JP | 06-183117 | 7/1994 |
| JP | 07-108688 | 4/1995 |
| JP | 07-315590 A | 12/1995 |
| JP | 08-90879 | 4/1996 |
| JP | 08-118653 | 5/1996 |
| JP | 09-036941 | 2/1997 |
| JP | 09-113990 A | 5/1997 |
| JP | 09-116843 | 5/1997 |
| JP | 09-267487 | 10/1997 |
| JP | 10-126728 | 5/1998 |
| WO | WO 97/04353 A | 2/1997 |
| WO | WO 97/50243 A | 12/1997 |

* cited by examiner

INK CARTRIDGE FOR A COMPUTER SYSTEM HAVING AN INTEGRAL PRINTER

CROSS-REFERENCE TO RELATED APPLICATIONS

The present Application is a Continuation of U.S. application Ser. No. 12/114,811 filed May 4, 2008, which is a Continuation of U.S. application Ser. No. 11/298,633, filed on Dec. 12, 2005, now issued U.S. Pat. No. 7,370,947, which is a Continuation of U.S. application Ser. No. 10/982,772, filed on Nov. 8, 2004, now issued U.S. Pat. No. 7,063,408, which is a Continuation of U.S. application Ser. No. 10/713,058, filed on Nov. 17, 2003, now issued U.S. Pat. No. 7,101,034, which is a Continuation of U.S. application Ser. No. 09/436,508, filed on Nov. 9, 1999, now issued U.S. Pat. No. 6,626,529, all of which are herein incorporated by reference.

FIELD OF THE INVENTION

The present invention relates to print media supply cartridges for printers. The invention has been developed primarily for use as a combined paper and ink supply cartridge and will be described hereinafter with reference to this particular preferred form. However, it will be appreciated that the inventive concept is applicable to all print media cartridges including those without an integral ink supply.

SUMMARY OF THE INVENTION

According to an aspect of the present disclosure, an ink cartridge for a computer system having an integral printer includes a media housing portion having top and bottom moldings mated to form a housing for storing sheets of paper therebetween, the housing portion having a print media transport mechanism; an ink storage portion having an ink storage base molding defining a plurality of distinct ink chambers, the ink storage base molding attached to an underside of the bottom molding and sealed therewith; and an ink manifold having ink outlet nozzles adapted to facilitate fluid communication with the printer, the ink outlet nozzles provided on a surface attached to and extending beyond an edge of the bottom molding. Each of the distinct ink chambers include a portion extending beyond the edge of the bottom molding, which portions form part of the ink manifold.

BRIEF DESCRIPTION OF THE DRAWINGS

A preferred embodiment of the invention will now be described, by way of example only, with reference to the accompanying drawings in which.

DESCRIPTION OF PREFERRED AND OTHER EMBODIMENTS

Figure 1:
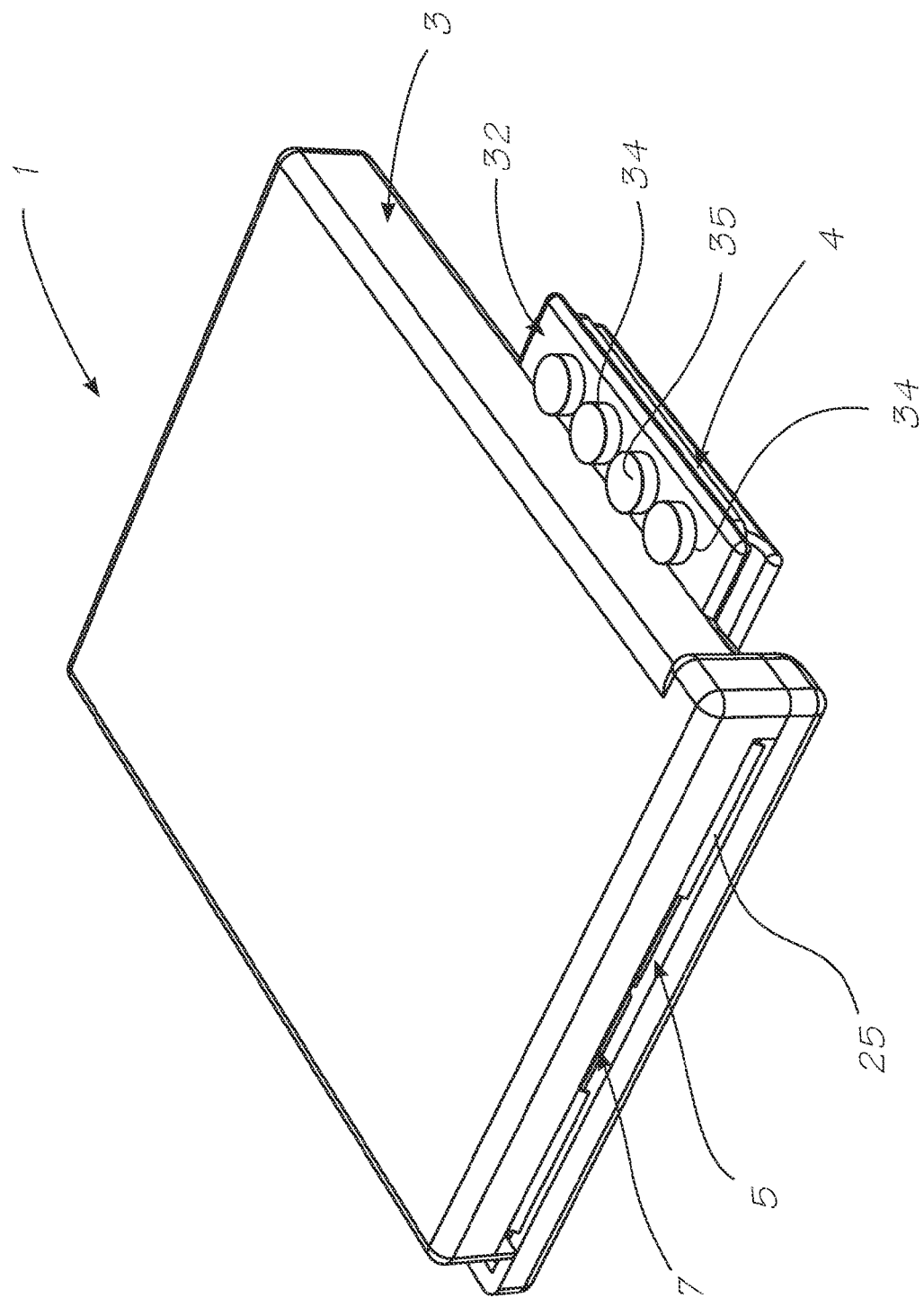
FIG. 1: is a top perspective view of a cartridge in accordance with the invention.
Figure 2:
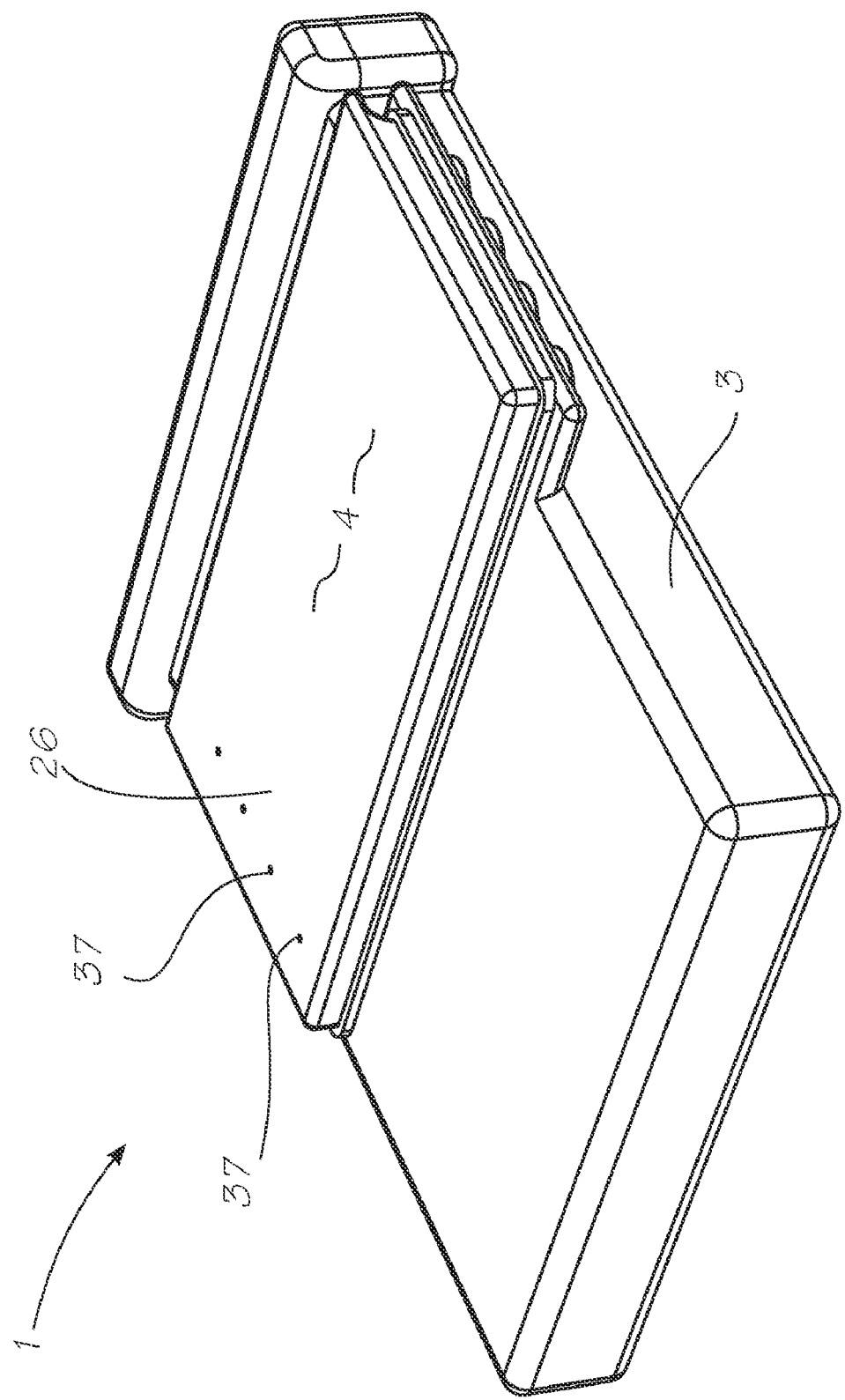
FIG. 2: is an inverted perspective view of the cartridge shown in FIG. 1.
Figure 3:
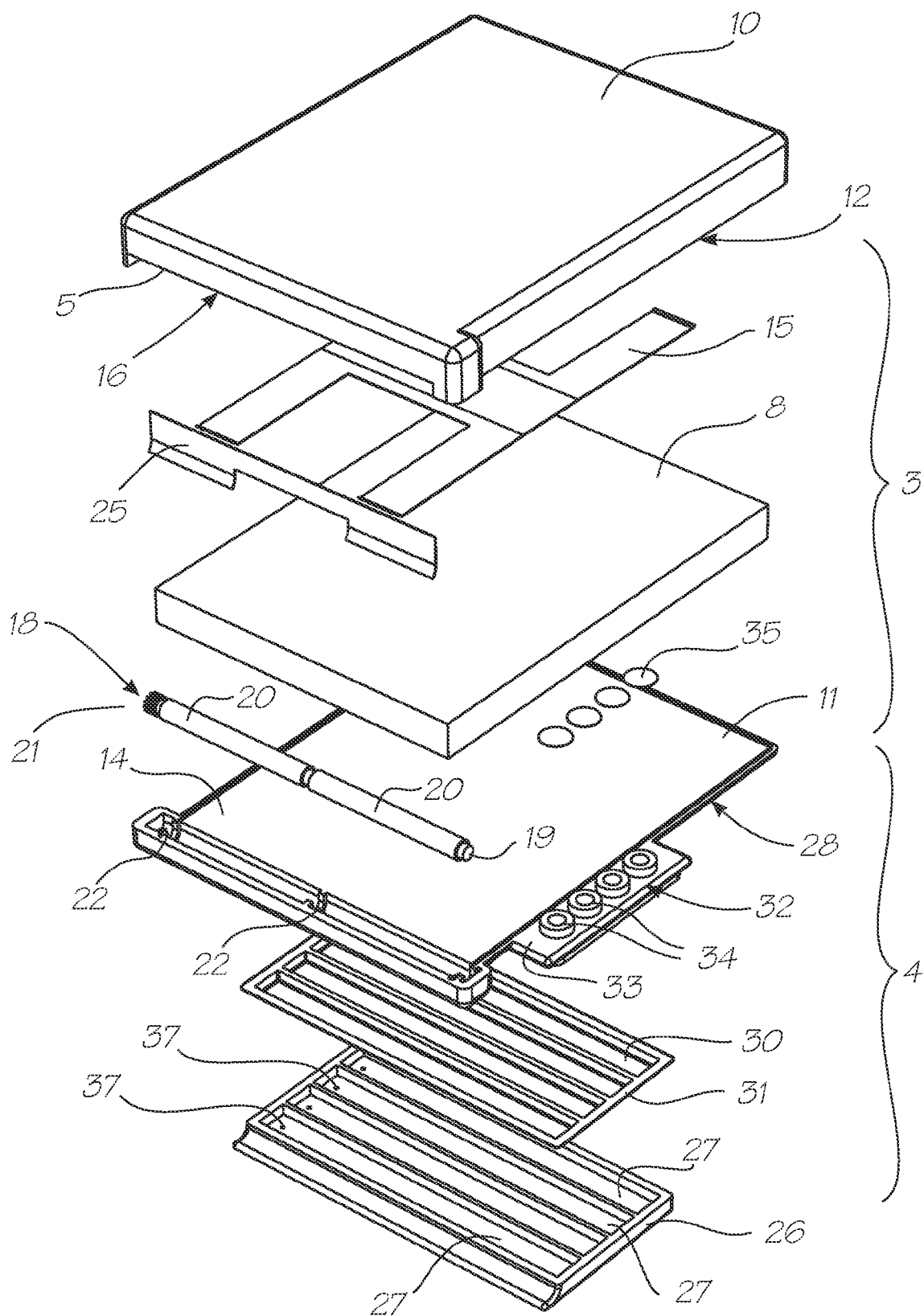
FIG. 3: is an exploded perspective top view shown in the same orientation as that shown in FIG. 1.
Figure 4:
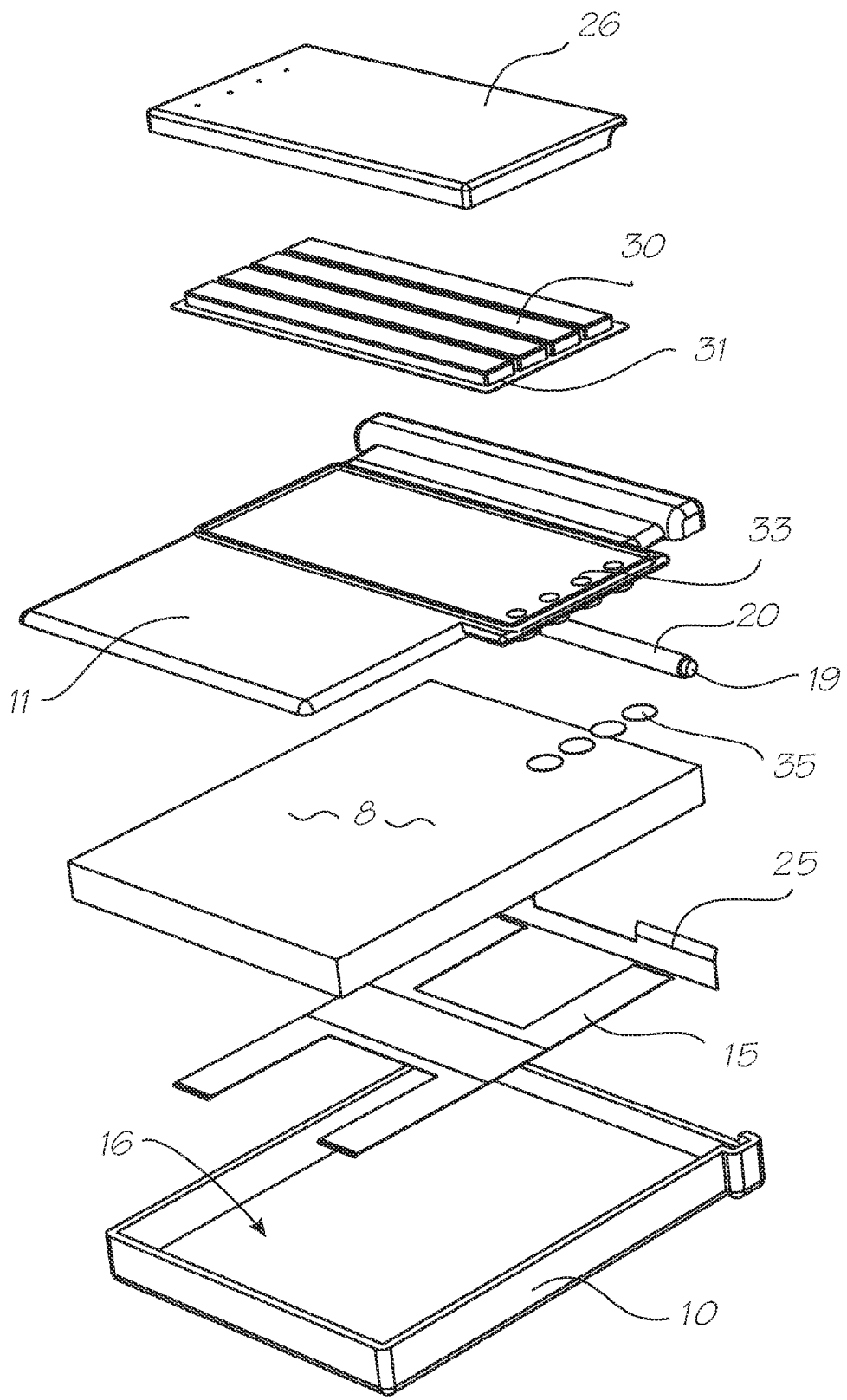
FIG. 4: is an exploded inverted perspective view shown in the same orientation as FIG. 2.
Figure 5:
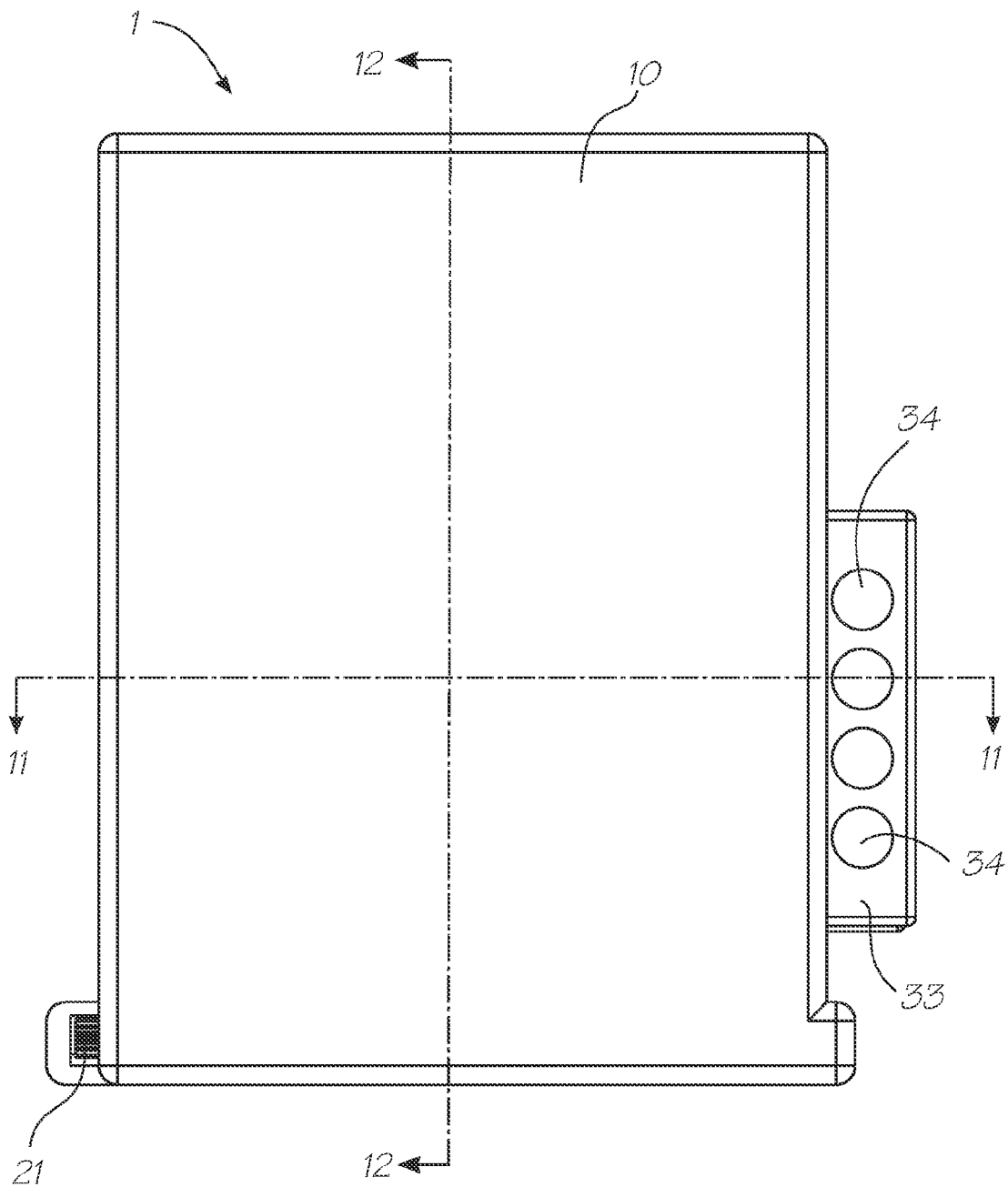
FIG. 5: is a top plan view of the cartridge of the previous figures.
Figure 6:
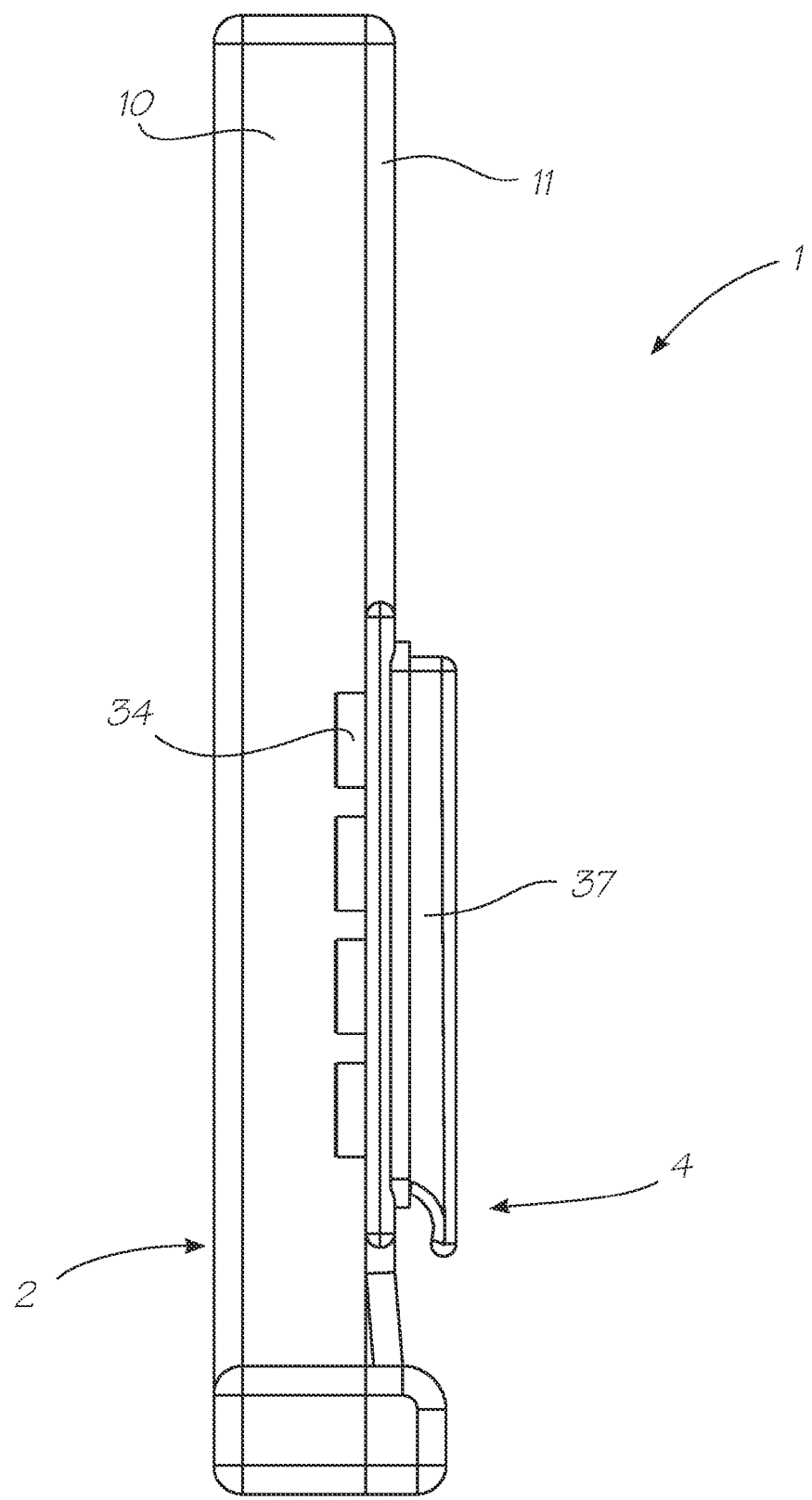
FIG. 6: is a right hand side view of the cartridge shown in FIG. 5.
Figure 7:
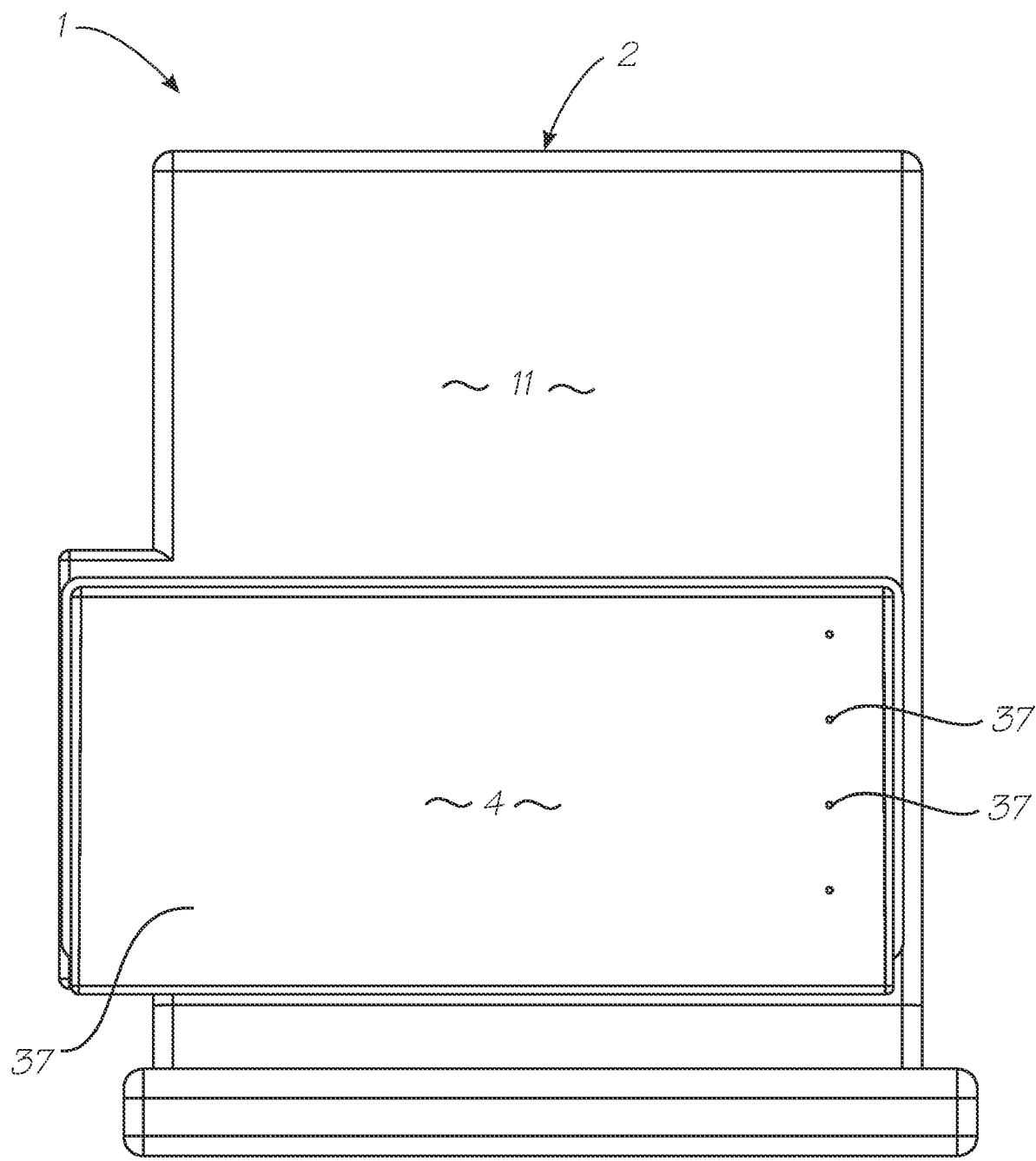
FIG. 7: is an inverted plan view of the cartridge of the previous figures.
Figure 8:
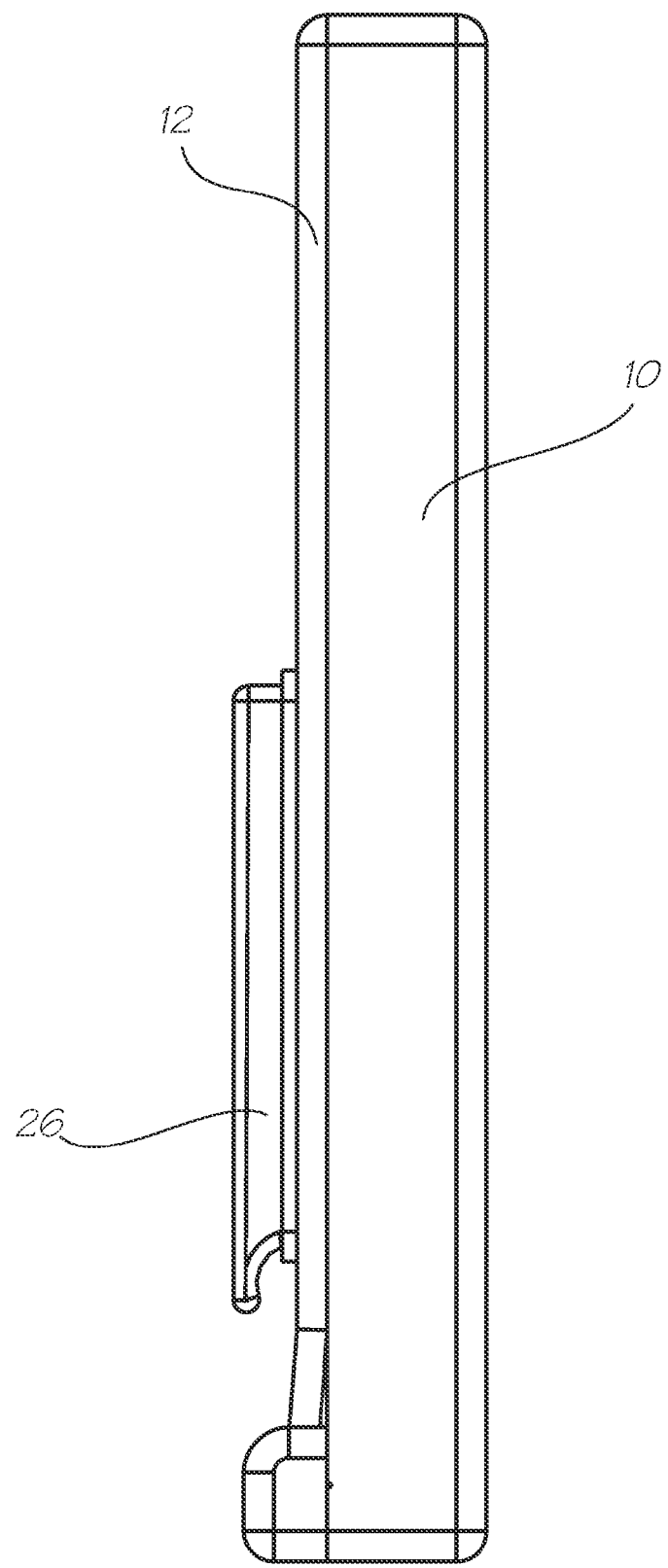
FIG. 8: is a left hand side view of the same cartridge.
Figure 9:
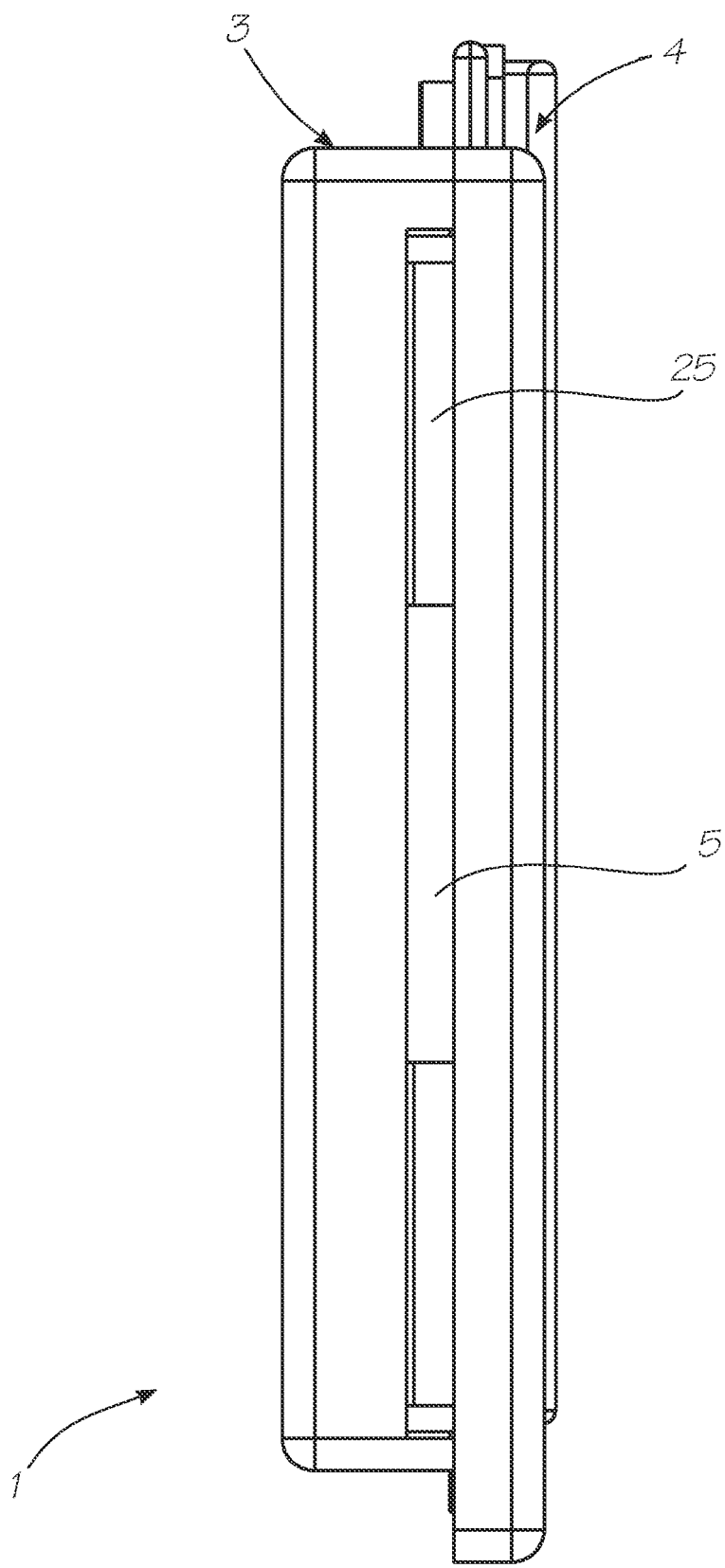
FIG. 9: is a front view of the same cartridge.
Figure 10:
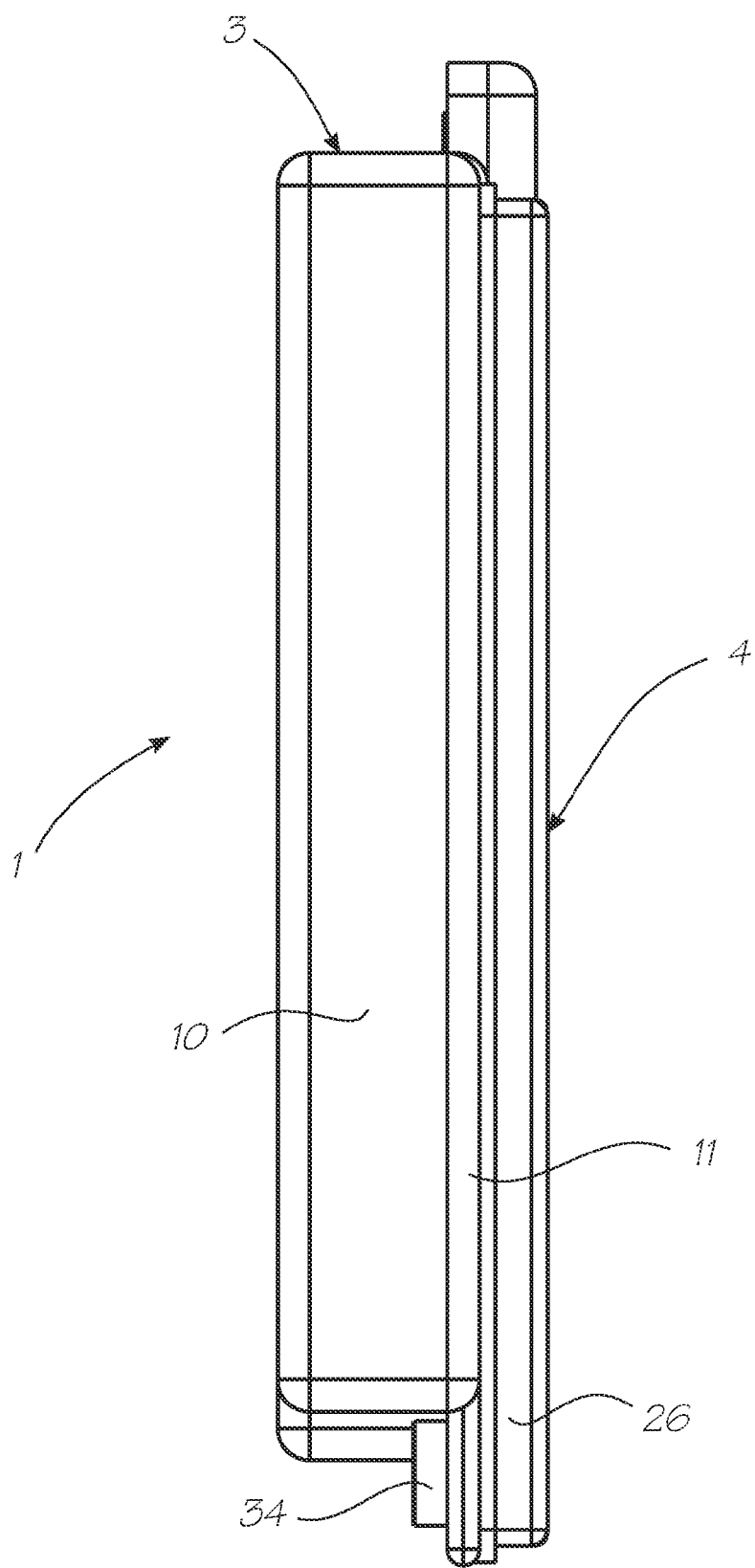
FIG. 10: is a rear view of the same cartridge.
Figure 11:
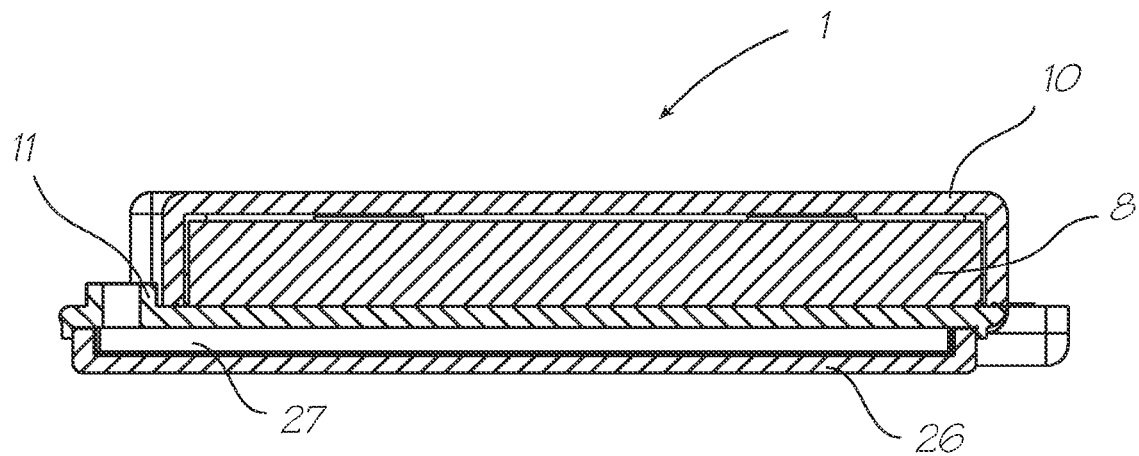
FIG. 11: is a sectional rear view taken on line 11-11 of FIG. 5.
Figure 12:
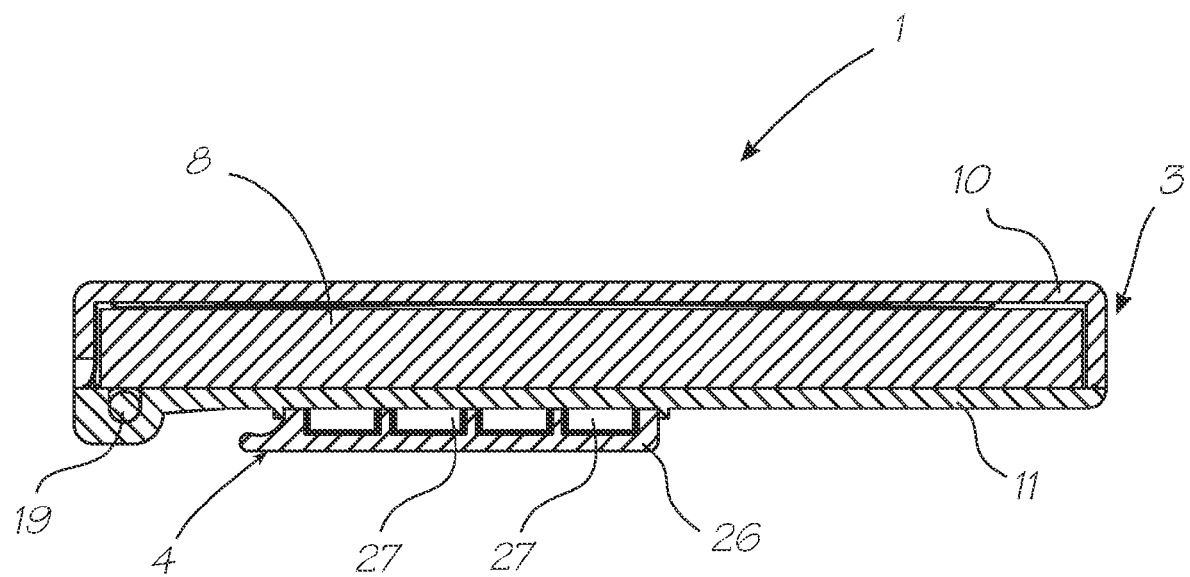
FIG. 12: is a sectional side view taken on line 12-12 of FIG. 5.

Referring to the drawings, there is shown a cartridge 1 for a printing device including a casing shown generally at 2. In the illustrated preferred form, the casing is divided into two main portions comprising, a print media supply portion 3 for housing sheets of paper and the like, and a second storage portion 4 for housing an ink supply. This cartridge is designed for use with digital printing devices, and is particularly suitable for drop-on-demand ink jet printing devices.

The casing 2 also defines a print media exit opening 5 that connects with the print media storage portion 3 and a print media transport mechanism shown generally at 7. This transport mechanism is disposed within the print media housing portion 3 adjacent the print media exit 5, such that upon operation it picks up and drives the print media 8 out through the print media exit opening.

Turning first to consider the elements of the print media storage portion of the cartridge, it can be seen to comprise a media top molding 10 which mates with a corresponding bottom molding 11. In this manner the moldings combine to define a generally rectangular print media storage region 12 in which is housed print media in the form of a stack of paper sheets or cards.

The top and bottom moldings 10 and 11 are both configured at a front end to define, in combination, the print media exit opening 5. In use, the stack of cards 8 are disposed within the storage region 12. These are biased downwardly toward engagement with an upper surface 14 of the bottom molding 11 by means of thin metal springs 15 which bear against an inner lower surface 16 of the top molding 10.

The print media transport mechanism of the preferred form illustrated is in the form of a geared pick up roller assembly 18. This assembly includes a drive shaft 19, pick up rollers 20 that are rigidly secured to the drive shaft, and an external drive gear 21.

The transport assembly 18 is captively retained within the casing portion formed by the top and bottom print media moldings, the drive shaft 19 being rotatably supported by means of arcuate ribs 22 formed in a channel 23 located beneath the exit opening 5. The top molding fully encloses the portion of the drive shaft holding the pick up rollers 20, but leaves the external drive gear 21 exposed as shown. In an alternate form, the drive gear may be accessed via an opening in the casing for engagement with a corresponding powered roller on the printer device. A plastic or metal foil 25 is also provided adjacent the exit opening 5. This foil is sized to extend downwardly across the exit such that once the transport mechanism is operated, only a single sheet of paper or card is driven through the exit at any one time.

The ink storage portion 4 is similarly defined by two separate moldings forming part of the cartridge casing. The primary molding is the ink storage base molding 26 which is configured to define a plurality of distinct ink chambers 27. Ultimately, the chambers are sealed by direct or indirect connection of this base molding 26 to a cover molding, which in this preferred form is provided by an underside 28 of the print media storage bottom molding 11.

In the preferred form shown, the connection of the two moldings is indirect, as there is provided an intermediate thin walled deformable film 30 which is preferably initially contoured to nest within the ink chambers 27 defined in the base molding 26. During assembly, the base molding 26 is sealingly connected with a flange 31 provided around the periphery of the thin walled deformable film 30 which in turn is sealingly connected with the underside 28 of the print media storage bottom molding 11.

As can be seen from the drawings, the ink chambers base molding 27 preferably extends beyond the peripheral edge of the print media storage region above, so as to define an ink supply connection manifold region 32. The upper portion of the manifold 32 is formed as an extension 33 of the print media storage bottom molding 11 and includes thereon a plurality of ink connection nozzles 34 which are closed by means of pierceable ink seals 35. In use the ink is stored above the deformable film and is thereby in fluid communication with the ink connection nozzles 34. In order to facilitate collapsing of the deformable film 30 as the ink is withdrawn, air vents 37 are provided in the ink storage base molding 26, preferably at the end remote from the ink nozzles. The various components of the cartridge casing can be assembled by any suitable means including use of adhesives, ultrasonic welding or mechanical fasteners or the like.

A preferred application of the cartridge of the invention as hereinbefore described is for use in a video games console having an integral printer of the kind described in Australian provisional patent application PP7020 and corresponding US application entitled "A computer system with integral printer device" filed concurrently herewith, the contents of which are incorporated herein by reference.

In use, the cartridge of the invention is inserted into an appropriately configured printer device whereby the drive gear 21 aligns with and engages a corresponding driven gear provided on the printer mechanism. The advantages of this configuration are numerous. Most importantly, the provision of the transportation means within the cartridge, ensures that the paper or other print media is fed out of the cartridge accurately and with minimum initial contamination, as the mechanism and print media are housed within an enclosed unit. In cartridges of the prior art, the cartridge is pressed onto a pick up roller mounted in the printer device, which exposes the paper on the underside. By contrast, the present design allows for greater structural integrity as there is no need to provide an opening that exposes the print media to that same extent. Further, the design provides for a tamper proof unit.

Additional advantages relating to the preferred forms include the provision of seals over the ink outlet nozzles that are pierceable automatically by the printer mechanism upon loading. In this regard, the cartridge is intended only as a single use product. Additionally, the structure of the ink chamber molding whereby the deformable film and base can be molded or joined in a simultaneous operation to form a completely sealed ink chamber, clearly offers manufacturing cost and efficiency advantages.

It will be appreciated by those skilled in the art that whilst the invention has been described with reference to a specific example, the concept can be embodied in many other forms. For example, the print media transport mechanism need not be limited to a pick up roller mechanism, but could include any other suitable mechanisms which can be externally driven from outside the cartridge casing. Similarly, the means of storage of the ink is not limited to the form described and could include the use of other deformable or non-deformable storage means. Accordingly, the preferred embodiment described should be considered in all respects to be illustrative and not restrictive.

We claim:

1. An ink cartridge for a computer system having an integral printer, said cartridge comprising:
    a media housing portion having top and bottom moldings mated to form a housing for storing sheets of paper therebetween, the housing portion having a print media transport mechanism;
    an ink storage portion having an ink storage base molding defining a plurality of distinct ink chambers, the ink storage base molding attached to an underside of the bottom molding and sealed therewith; and
    an ink manifold having ink outlet nozzles adapted to facilitate fluid communication with the printer, the ink outlet nozzles provided on a surface attached to and extending beyond an edge of the bottom molding, wherein
    each of the distinct ink chambers include a portion extending beyond the edge of the bottom molding, which portions form part of the ink manifold, and
    the media housing portion defines a print media exit opening, and the print media transport mechanism is disposed within the print media housing portion adjacent the print media exit.

2. The ink cartridge of claim 1, wherein the media housing portion includes springs bearing against an inner lower surface of the top molding, the springs biased downwardly towards engagement with an upper surface of the bottom molding to position sheets of paper inside said media housing portion.

3. The ink cartridge of claim 1, wherein the print media transport mechanism includes a geared pick up roller assembly including a drive shaft, pick up rollers rigidly secured to the drive shaft, and an external drive gear.

4. The ink cartridge of claim 1, further comprising a foil provided adjacent the exit opening, the foil sized to extend downwardly across the exit opening to ensure the driving of a single sheet of paper through the exit opening at any one time.

5. The ink cartridge of claim 1, further comprising an intermediate thin walled deformable film contoured to nest within the ink chambers defined in the base molding, the base molding engaged sealingly with a flange provided around the periphery of the thin walled deformable film which in turn is sealingly connected with the underside of the print media storage bottom molding.

* * * * *